United States Patent
Campbell et al.

[11] Patent Number: 5,886,305
[45] Date of Patent: Mar. 23, 1999

[54] SOUND INSULATING LAYER WITH INTEGRAL RIB STRUCTURE

[75] Inventors: Michael T. Campbell, Grand Rapids; Eric G. Owen, Marne, both of Mich.

[73] Assignee: Cascade Engineering, Inc., Grand Rapids, Mich.

[21] Appl. No.: 899,619

[22] Filed: Jul. 24, 1997

Related U.S. Application Data

[60] Provisional application No. 60/022,678 Jul. 26,1996.
[51] Int. Cl.⁶ ........................................................ E04B 1/82
[52] U.S. Cl. ............................................. 181/286; 181/290
[58] Field of Search ..................................... 181/286, 290, 181/284, 294, 207, 208

[56] References Cited

U.S. PATENT DOCUMENTS

| | | |
|---|---|---|
| 2,860,912 | 11/1958 | Barenyi . |
| 3,871,636 | 3/1975 | Boyle . |
| 4,010,975 | 3/1977 | Horton . |
| 4,310,193 | 1/1982 | Kolleas . |
| 4,353,433 | 10/1982 | Mohrenstein-Ertel et al. . |
| 4,726,438 | 2/1988 | Stuertz et al. . |
| 4,782,913 | 11/1988 | Hoffmann et al. .............. 181/286 |
| 4,867,271 | 9/1989 | Tschudin-Mahrer ............ 181/290 |
| 4,984,838 | 1/1991 | Kim . |
| 4,991,900 | 2/1991 | White . |
| 5,005,898 | 4/1991 | Benedetto et al. . |
| 5,483,028 | 1/1996 | Holwerda . |

FOREIGN PATENT DOCUMENTS

| | | |
|---|---|---|
| 0 705 994 | 4/1996 | European Pat. Off. . |
| 3730280-C1 | 12/1988 | Germany . |
| 0016141 | 1/1986 | Japan . |
| 01-293252 | 11/1989 | Japan . |
| 2 216 081 | 10/1989 | United Kingdom . |

*Primary Examiner*—Khanh Dang
*Attorney, Agent, or Firm*—Rader, Fishman, Grauer & McGarry

[57] ABSTRACT

An acoustical barrier (10) for a vehicle having a barrier wall which includes a floor area (23) and a fire wall area (25) extending between a wheel well area (41) and a drive train area (42). The acoustical barrier (10) includes a mass layer (12) that covers at least a portion of the barrier wall. The mass layer (12) has an inner surface (16) that faces the barrier wall with an integrally formed peripheral rib (52) projecting therefrom. A first set of elongate ribs (48) intersects and joins with a second set of elongate ribs (50). The first and second sets of elongate ribs (48, 50) are located within the enclosed area. Each elongate rib (48, 50) includes an upper portion integrally formed with the inner surface (16) of the mass layer and a lower portion with an outer edge (54, 60) adapted to at least face the barrier wall. Each elongate rib (48) of the first set of ribs also has opposite ends integrally formed with the peripheral rib (52) to thereby strengthen the peripheral rib against bending moments due to compression forces applied to the outer surface of the mass layer. Each elongate rib (50) of the second set of ribs has opposite ends integrally formed with either adjacent ribs (48) of the first set of ribs or the peripheral rib (52) and an adjacent rib (48) of the first set of ribs to thereby further strengthen the peripheral rib (52) against bending moments. The first set of ribs projects from the inner surface of the mass layer a greater distance than the second set of ribs to provide increasing levels of impact resistance to the outer surface of the mass layer.

22 Claims, 3 Drawing Sheets

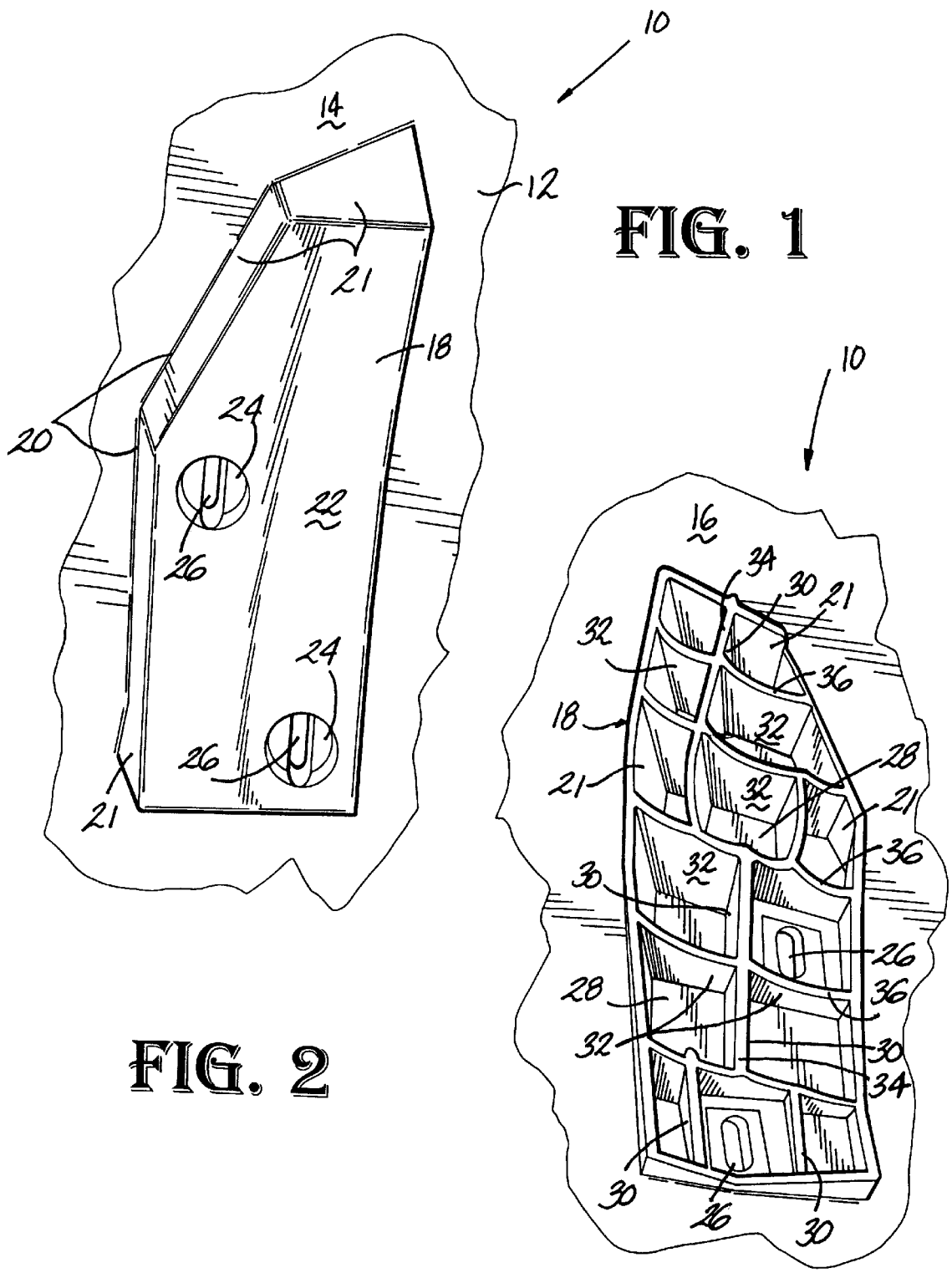

5,886,305

SOUND INSULATING LAYER WITH INTEGRAL RIB STRUCTURE

RELATED APPLICATIONS

This application claims the benefit of U.S. provisional application Ser. No. 60/022,678 filed on Jul. 26, 1996.

BACKGROUND OF THE INVENTION

1. FIELD OF THE INVENTION

This invention relates to a sound insulating layer for a vehicle, and more particularly to a dash mat having an integrally formed dead pedal and/or integrally molded compression ribs in the podalic areas of the vehicle.

2. DESCRIPTION OF THE RELATED ART

In most contemporary automobiles, a steel fire wall separates the engine compartment from the passenger compartment. To reduce the transmission of sound from the engine compartment through the fire wall and into the passenger compartment, a sound barrier mat (otherwise known as a dash mat) is typically molded as a single piece of an elastomeric material of substantially uniform thickness with limited impact absorption qualities. The dash mat is mounted to and substantially overlies the fire wall such that an outer surface of the mat is in contact with a bottom surface of the vehicle carpet and extends beyond the carpet to an upper portion of the fire wall behind the instrument panel. A vehicle dead pedal, which serves as a foot rest for a driver, is typically formed of steel or plastic and is subsequently installed with fasteners on the wheel well of a vehicle. An opening or protrusion in the dash mat is then aligned over the dead pedal and the dash mat is attached with separate fasteners to the fire wall. Installation of the dead pedal and dash mat in this manner requires a plurality of different parts and fasteners. The plurality of parts and fasteners results in increased inventory, expense, and installation time.

SUMMARY OF THE INVENTION

These and other problems of the prior art are overcome by an acoustical barrier for a vehicle having an integrally formed rib structure in the podalic area of the vehicle.

According to the invention, an acoustical barrier adapted to be mounted to a barrier wall, such as the wall of a vehicle or other structure, comprises a mass layer of a molded construction and sound dampening characteristics with an inner surface that is adapted to face the barrier wall and an outer surface adapted to face away from the barrier wall. A peripheral rib has an upper portion integrally formed with the inner surface of the mass layer and a lower portion with an outer edge that is adapted to contact the barrier wall. The peripheral rib defines an enclosed area on the inner surface of the mass layer. A first set of resilient projections are located within the enclosed area. Each projection has an upper portion integrally formed with the mass layer and a lower portion with an outer edge adapted to contact the barrier wall. Each projection extends a first distance from the inner surface to the outer edge. A second set of resilient projections are located within the enclosed area. Each projection of the second set includes an upper portion integrally formed with the mass layer and a lower portion with an outer edge adapted to face the barrier wall. Each projection of the second set extends a second distance from the inner surface to the outer edge. Preferably, the second distance is less than the first distance. With this arrangement, the first set of projections resiliently resists compressive forces applied to the outer surface of the mass layer at a first predetermined level and the second set of projections together with the first set of projections resiliently resist compressive forces at a second predetermined level greater than the first predetermined level.

In a preferred embodiment, the first set of projections includes a plurality of generally elongated first ribs. Each rib has opposite ends integrally formed with the peripheral rib to thereby strengthen the peripheral rib against bending moments due to compression forces applied to the outer surface of the mass layer.

Likewise, the second set of projections includes a plurality of generally elongated second ribs extending in a cross direction to the first ribs. Each of the second ribs has opposite ends integrally formed with either adjacent first ribs or the peripheral rib and an adjacent longitudinally extending rib to thereby farther strengthen the peripheral rib against bending moments.

Further according to the invention, the mass layer is adapted for installation in a vehicle having a barrier including a floor area and a fire wall area extending between a wheel well area and a drive train area. The fire wall area intersects with and extends generally upwardly from the floor area. The mass layer also includes a wheel well section shaped to conform to at least a portion of the shape of the wheel well area, and floor and fire wall sections shaped to conform to at least a portion of the shape of the floor and fire wall areas, respectively, of the vehicle.

In one embodiment, the enclosed area including the first and second sets of projections comprises a podalic zone extending along at least a portion of the floor and firewall sections of the mass layer.

In a further embodiment, a the enclosed area including the first and second sets of projections comprises a dead pedal zone extending along at least a portion of the wheel well section of the mass layer.

The acoustic barrier can also include an absorber layer having an outer surface in contact with an inner surface of the mass layer and an inner surface adapted to contact the barrier wall. Preferably, the absorber layer has an opening that is sized to receive the peripheral rib such that the enclosed area is substantially free of the absorber material.

Further according to the invention, an acoustical barrier adapted to be mounted to a barrier wall comprises a mass layer of a molded construction and sound dampening characteristics with an inner surface that is adapted to face the barrier wall and an outer surface adapted to face away from the barrier wall. A peripheral rib has an upper portion integrally formed with the inner surface of the mass layer and a lower portion with an outer edge adapted to contact the barrier wall to thereby define an enclosed area on the inner surface of the mass layer. A first set of elongate ribs are located within the enclosed area. Each elongate rib includes an upper portion integrally formed with the inner surface of the mass layer and a lower portion with an outer edge adapted to at least face the barrier wall. Each elongate rib also has opposite ends integrally formed with the peripheral rib to thereby strengthen the peripheral rib against bending moments due to compression forces applied to the outer surface of the mass layer.

Preferably, the elongate ribs generally extend in the same direction. A second set of elongate ribs located within the enclosed area can be provided. Each rib of the second set of ribs has an upper portion integrally formed with the inner surface of the mass layer, a lower portion with an outer edge adapted to at least face the barrier wall, and opposite ends integrally formed with either adjacent ribs of the first set of ribs or the peripheral rib and an adjacent rib of the first set of ribs to thereby further strengthen the peripheral rib against bending moments.

BRIEF DESCRIPTION OF THE DRAWINGS

The invention will now be described with reference to the drawings in which:

FIG. 1 illustrates a front view (as viewed from the driver's seat) of a dead pedal integrally formed with the vehicle dash mat;

FIG. 2 is a rear view of the dead pedal and dash mat;

DETAILED DESCRIPTION OF THE PREFERRED EMBODIMENTS

Figure 3:
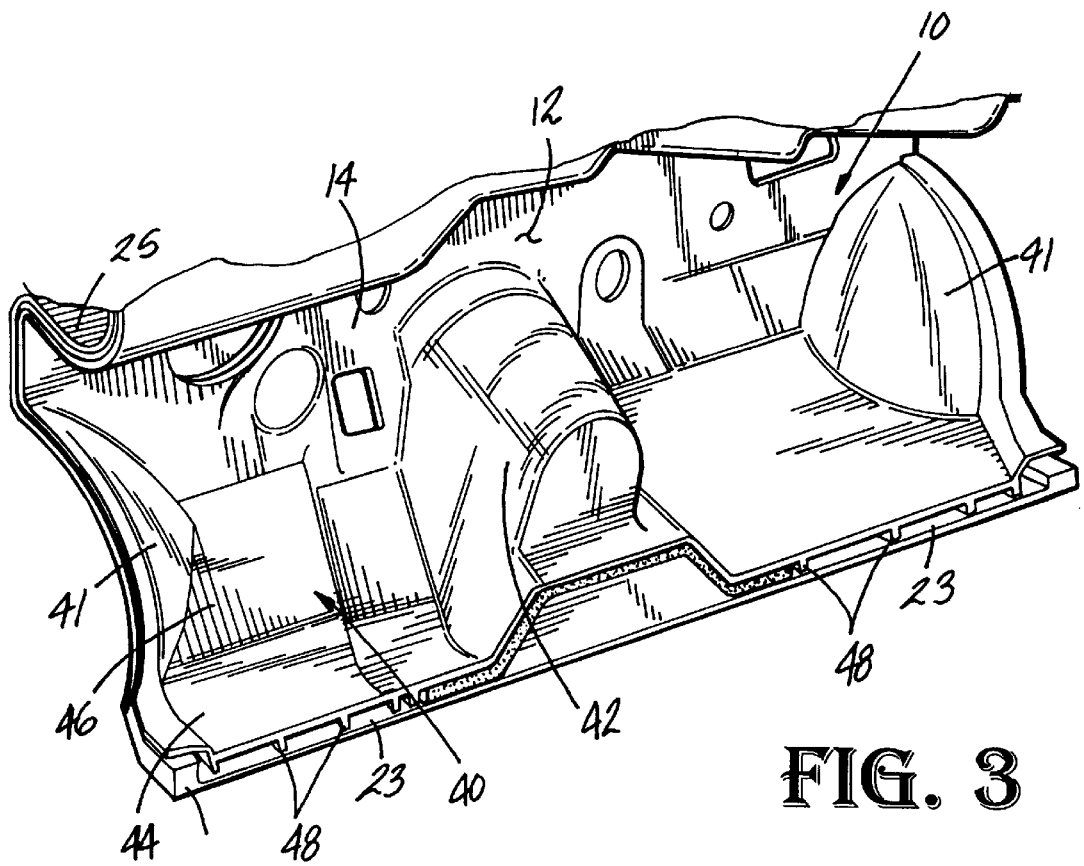
FIG. 3 is a top perspective view of the dash mat assembly overlaying the fire wall showing the podalic area according to the invention.

Referring now to FIGS. 1–2, a dash mat assembly 10 includes a mass layer or dash mat 12 having a first outer surface 14 and a second inner surface 16. A dead pedal 18 is integrally formed in one piece with the mat 12 and protrudes outwardly from the first surface 14. The dash mat assembly 10 is preferably formed of a filled elastomeric moldable polymer, e.g., elastomeric polypropylene, and serves as a sound barrier layer to reduce the transmission of sound from the engine compartment through the fire wall and into the passenger compartment of a vehicle. A lower periphery 20 of the dead pedal 18 is continuous with the dash mat outer surface 14 and is shaped to conform to the surface of a vehicle wheel well (FIG. 3), such that an upper surface 22 of the dead pedal 18 faces toward the rear of the vehicle and at a convenient position for a user's foot when installed. A dead pedal peripheral wall 21 is integrally formed with the lower periphery 20 and the upper surface 22 of the dead pedal 18.

A plurality of circular recesses 24 extend inwardly from the dead pedal upper surface 22 for receiving a fastener (not shown). Each recess includes an elongate slot 26 for receiving a fastener stud or shaft (not shown) that typically extends from the vehicle fire wall. The slots 26 are sufficient so that the dash mat 12 and dead pedal 18 can be adjusted with respect to the vehicle fire wall with the studs projecting through the slots during installation. Although only two recesses and slots are shown, it is to be understood that a single recess and slot or a plurality of such can be provided depending on the amount of securement needed. In addition, the recesses and/or slots can be eliminated and the dead pedal can be free floating, depending on the type of vehicle in which the dash mat is installed. The recesses and/or slots can also be used for the installation of a decorative cover.

With particular reference to FIG. 2, a first set of generally longitudinally extending ribs 30 and a second set of generally laterally extending ribs 32 project from an inner surface 28 of the dead pedal 18. The first and second sets of ribs 30, 32 extend approximately perpendicular to each other and provide structural support to the dead pedal 18 to resist forces applied by a driver's foot. The first and second sets of ribs 30, 32 also give the dead pedal sufficient strength to mount a cover (not shown) directly to the dead pedal through fasteners. Outer edges 34 of the ribs 30 are adapted to abut the wheel well of a vehicle and, with the peripheral wall 21, thus support the dead pedal 18 thereagainst. Outer edges 36 of the ribs 32 are curved toward the inner surface 28 and generally do not contact the wheel well.

In the installed position, the inner surface 16 of the dash mat 12 and the outer edges 34 of the ribs 30 face the vehicle fire wall 25 (FIG. 3), while the outer surfaces 14, 22 face the underside of a vehicle carpet (not shown). The outer surface 14 of the dash mat 12 may also extend past the carpet behind the instrument panel.

Although the invention finds particular use in automobile dash mats, it is to be understood that the invention also finds use in other automotive or non-automotive applications wherein a panel or layer of material having an integrally formed support surface is to be attached temporarily or permanently to a support surface. For example, the dead pedal structure, i.e. the reinforcing ribs, increased mat thickness, and/or fastener openings, can be formed at other locations in the dash mat to provide structural support for mounting electrical modules, HVAC cases, decorative panels, and other vehicle accessories. Moreover, although the dead pedal has been illustrated with a particular shape, it is to be understood that other shapes can be formed in the dash mat depending on the intended application.

Figure 4:
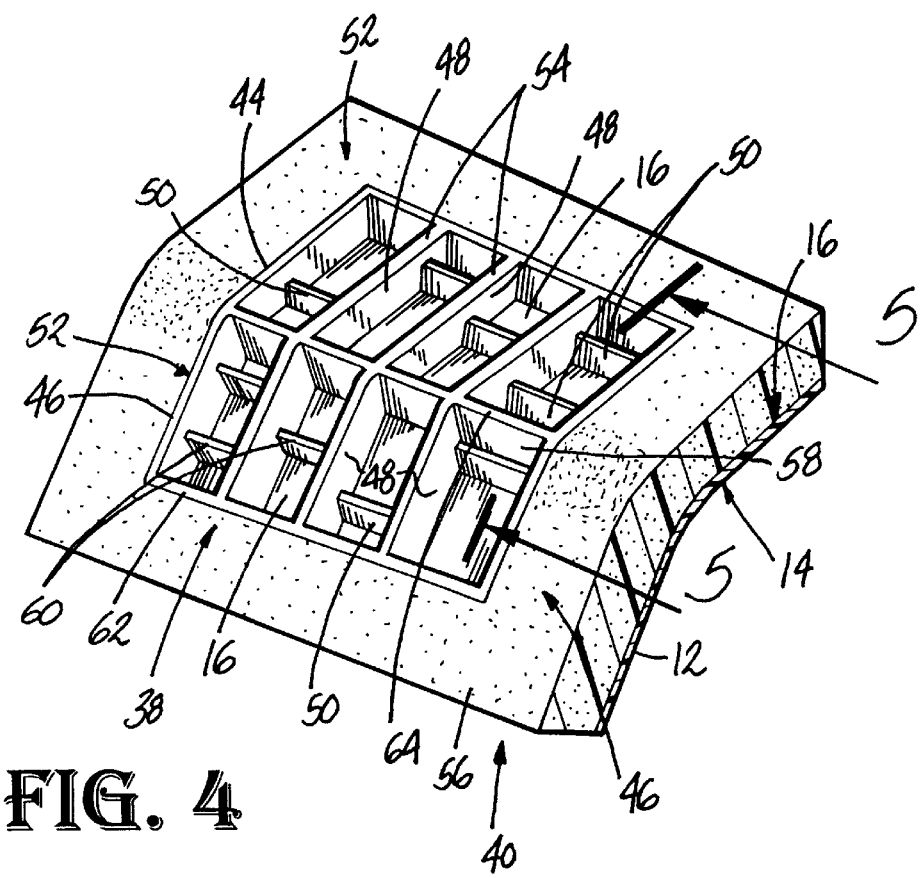
FIG. 4 is a partial sectional view of the inner surface of the dash mat with a sound absorber layer showing the compression rib structure of the podalic area according to the invention.

Referring now to FIGS. 3 and 4, a barrier wall includes a drive train area 42, a wheel well area 41, and floor and fire wall areas 23, 25 extending between the drive train area and the wheel well area. The fire wall area 25 intersects with and extends generally upwardly from the floor area 23. The dash mat assembly 10 may, in addition to or alternatively of the dead pedal 18, include a compression rib matrix 38 integrally formed with the dash mat 12 inner surface 16 at a podalic zone or area 40. The podalic zone 40 is located at the intersection of the floor 23 and the fire wall area 25 between the wheel well area 41 and the drive train area 42. The podalic zone 40 is substantially divided into a lower podalic portion 44 and an upper podalic portion 46. The lower podalic portion 44 extends partially along the vehicle floor 23 adjacent the fire wall 25 and is integrally formed with the upper portion 46 which extends partially upwards along the fire wall 25 adjacent the floor 23.

With particular reference to FIG. 4, which is a rear view in partial cross section of the podalic zone 40, the compression rib matrix 38 includes generally longitudinally extending ribs 48 and generally laterally extending ribs 50 that project from an inner dash mat surface 16 of the podalic area 40. The ribs 48 extend approximately perpendicular to the ribs 50 with the ribs 48 having outer edges 54 and the ribs 50 having outer edges 60. A peripheral rib 52 forms the outer perimeter of the compression rib matrix 38. A central rib 58 is formed integral with the peripheral rib 52 and is located at the intersection of the upper and lower podalic portions 44, 46. Both the peripheral rib 52 and central rib 58 have outer edges 62 and 64, respectively.

In the installed position, the outer edges 54 and 62 normally contact the fire wall 25 and the floor 23; the outer edges 60 and the inner surface 16 initially face the fire wall and floor; and the outer edge 58 extends along and contacts the intersection of the fire wall and floor.

The acoustic barrier 10 can also include an absorber layer 56 that is arranged between the inner surface 16 of the dash mat 12 and the fire wall 25 and/or floor 23 outside of the podalic area 40. The outer surface 14 of the dash mat 12 faces the underside of a vehicle carpet (not shown) and is substantially uniform across the podalic area 40.

Figure 5:
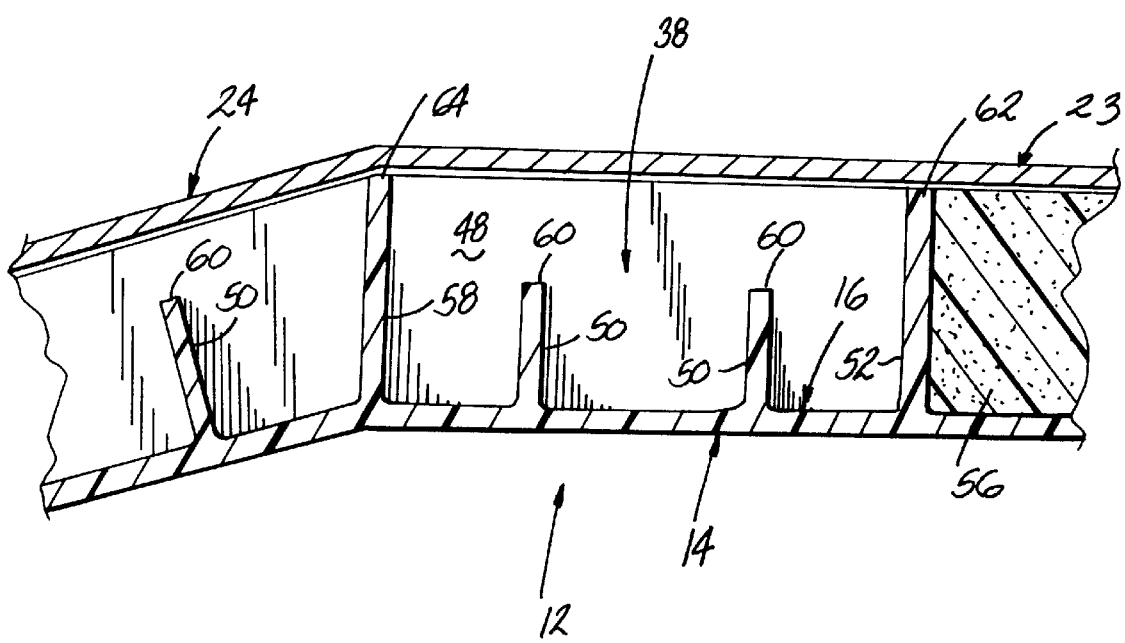
FIG. 5 is a cross-sectional view taken along line 5—5 of FIG. 4, showing the variable height of the compression ribs.

FIG. 5 is a cross-sectional view taken along line 5—5 of FIG. 4, showing an exemplary arrangement of the compression ribs. The ribs 48, 50, 52 and 58 project from the inner surface 16 of the podalic area 40 at variable lengths to conform to the shape of the floor 23 and fire wall 25 and to provide structural support of variable resistance when a force is applied to the podalic area 40. As illustrated, a first set of ribs, comprising ribs 48, peripheral rib 52 and central rib 58, projects a first distance from the inner surface 16 such that the ribs 48, 58 and 52 space the inner surface 16 of the dash mat a predetermined distance from the fire wall 25 and the floor 23. A second set of ribs, comprising the ribs 50, projects a second distance from the inner surface 16. Preferably, the first distance is greater than the second distance, such that the outer surfaces 60 of the ribs 50 are initially spaced away from the wall 25 and floor 23. An impact of sufficient force applied to the outer surface of the podalic area 40 toward the floor 23 and/or fire wall 25 causes one or more of the ribs 48, 52 and 58 to flex and thereby initially dampen the impact force. The initial level of dampening or impact resistance can be controlled by varying the number of ribs 48 and varying the thickness, height, length, spacing, shape, and orientation of the ribs 48, 52 and 58 to achieve the desired amount of initial impact resistance. If the impact force is large enough to exceed the initial impact resistance from the first set of ribs, one or more of the ribs from the first set continues to flex until one or more of the outer surfaces 60 of the ribs 50 contact the floor 23 and/or fire wall 25 to provide a second level of dampening or impact resistance. As with the first set of ribs, the second level of dampening or impact resistance for the second set of ribs can be controlled by varying the number of ribs 48 and varying the thickness, height, length, spacing, shape, and orientation of the ribs to achieve the desired amount of secondary impact resistance. The degree of impact resistance can additionally be controlled by surrounding the podalic zone 40 with an absorber layer 56 of desired stiffness. The integrally molded compression rib matrix 38 provides different levels of stiffness to the podalic zone 40 greater than a foam absorber layer alone and improves crash impact absorption and passenger safety. If desired, more than two degrees of impact resistance can be provided by the addition of increasingly shorter sets of ribs.

Although the invention finds particular use in the podalic zone 40, it is to be understood that the compression ribs can be integrally formed at other locations in the dash mat to provide increased impact resistance, such as at the dead pedal zone located on the wheel well of a vehicle. Furthermore, the invention is not limited to the particular arrangement of ribs as referenced in the drawings.

Reasonable variation and modification are therefore possible within the spirit of the foregoing specification and drawings without departing from the scope of the invention.

The embodiments for which an exclusive property or privilege is claimed are defined as follows:

1. An acoustical barrier adapted to be mounted to a barrier wall, the acoustical barrier comprising:
   a mass layer of a molded construction and sound dampening characteristics, the mass layer having an inner surface that is adapted to face the barrier wall and an outer surface adapted to face away from the barrier wall;
   a peripheral rib having an upper portion integrally formed with the inner surface of the mass layer and a lower portion with an outer edge adapted to contact the barrier wall, the peripheral rib defining a enclose area on the inner surface of the mass layer;
   a first set of resilient projections located within the enclosed area and having an upper portion integrally formed with the mass layer and a lower portion with an outer edge adapted to contact the barrier wall, each projection of the first set extending a first distance from the inner surface to the outer edge;
   a second set of resilient projections located within the enclosed area and in close proximity to the first set of resilient projections, the second set of resilient projections having an upper portion integrally formed with the mass layer and a lower portion with an outer edge adapted to face the barrier wall; each projection of the second set extending a second distance from the inner surface to the outer edge;
   wherein the first and second sets of projections are so shaped that only the first set of projections resiliently resist compression of the mass layer in the enclosed layer up to a first predetermined level and the second set of projections together with the first set of projections resiliently resist compression of the mass layer in the enclosed area beyond the first predetermined level.

2. An acoustical barrier according to claim 1 wherein the first set of projections includes a plurality of generally elongated first ribs, each first rib having opposite ends integrally formed with the peripheral rib to thereby strengthen the peripheral rib against bending moments due to compression forces applied to the outer surface of the mass layer.

3. An acoustical barrier according to claim 2 wherein the second set of projections includes a plurality of generally elongated second ribs which are generally cross to the first ribs, each second rib having opposite ends integrally formed with either adjacent first ribs or the peripheral rib to thereby further strengthen the peripheral rib against bending moments.

4. An acoustical barrier according to claim 3 wherein the mass layer is adapted for installation in a vehicle having the barrier wall, the barrier wall comprising a floor area and a fire wall area extending between a wheel well area and a drive train area, the fire wall area intersecting with and extending generally upwardly from the floor area, the mass layer further comprising:
   a wheel well section shaped to conform to at least a portion of the shape of the wheel well area; and
   floor and firewall sections shaped to conform to at least a portion of the shape of the floor and firewall areas, respectively.

5. An acoustical barrier according to claim 4 wherein the enclosed area including the first and second sets of projections comprises a dead pedal zone extending along at least a portion of wheel well section of the mass layer.

6. An acoustical barrier according to claim 4 and wherein the enclosed area including the first and second sets of projections is positioned in a podalic zone extending along at least a portion of the floor and firewall sections of the mass layer.

7. An acoustical barrier according to claim 6 wherein the first set of projections includes a central laterally extending rib that is adapted to contact the intersection of the floor and fire wall areas of the vehicle.

8. An acoustical barrier according to claim 6 and further comprising an absorber layer having an outer surface in contact with an inner surface of the mass layer and an inner surface adapted to contact the barrier wall.

9. An acoustical barrier according to claim 8 wherein the absorber layer has an opening that is sized to receive the peripheral rib and the absorber layer is located outside of the enclosed area.

10. An acoustical barrier according to claim 3 wherein the first set of projections includes a central laterally extending rib that intersects with each of the longitudinally extending ribs and the peripheral rib.

11. An acoustical barrier according to claim 1 and further comprising an absorber layer having an outer surface in contact with an inner surface of the mass layer and an inner surface adapted to contact the barrier wall.

12. An acoustical barrier according to claim 1 wherein the absorber layer has an opening that is sized to receive the predefined area such that the absorber layer is located outside of the predefined area.

13. An acoustical barrier according to claim 1 wherein the second distance is less than the first distance.

14. An acoustical barrier adapted to be mounted to a barrier wall, the acoustical barrier comprising:
   a mass layer of a molded construction and sound dampening characteristics, the mass layer having an inner surface that is adapted to face the barrier wall and an outer surface adapted to face away from the barrier wall;
   a first set of resilient projections located within a predefined area and having an upper portion integrally formed with the mass layer and a lower portion with an outer edge adapted to contact the barrier wall; each projection of the first set extending a first distance from the inner surface to the outer edge;
   a second set of resilient projections located within the predefined area and in close proximity to the first set of resilient projections, the second set of resilient projections having an upper portion integrally formed with the mass layer and a lower portion with an outer edge adapted to face the barrier wall; each projection of the second set extending a second distance from the inner surface to the outer edge;
   wherein the first and second sets of projections are so shaped that only the first set of projections resiliently resists compression of the mass layer in the predefined area up to a first predetermined level and the second set of projections together with the first set of projections resiliently resist compression of the mass layer in the predefined area beyond the first predetermined level; and
   an absorber layer having an outer surface in contact with an inner surface of the mass layer and an inner surface adapted to contact the barrier wall.

15. An acoustical barrier according to claim 14 wherein the absorber layer has an opening that is sized to receive the predefined area such that the absorber layer is located outside of the predefined area.

16. An acoustical barrier adapted to be mounted to a barrier wall, the acoustical barrier comprising:
   a mass layer of a molded construction and sound dampening characteristics, the mass layer having an inner surface that is adapted to face the barrier wall and an outer surface adapted to face away from the barrier wall;
   a peripheral rib having an upper portion integrally formed with the inner surface of the mass layer and a lower portion with an outer edge adapted to contact the barrier wall, the peripheral rib defining an enclosed area on the inner surface of the mass layer;
   elongate ribs located within the enclosed area, each elongate rib having an upper portion integrally formed with the inner surface of the mass layer and a lower portion with an outer edge adapted to face the barrier wall, each elongate rib having opposite ends integrally formed with the peripheral rib to thereby strengthen the peripheral rib against bending moments due to compression forces applied to the outer surface of the mass layer; and
   a first set of the elongate ribs generally extending in the same direction and a second set of the elongate ribs having opposite ends integrally formed with either adjacent ribs of the first set of ribs or the peripheral rib and an adjacent rib of the first set of ribs to thereby further strengthen the peripheral rib against bending moments, the first set of ribs projecting a greater distance from the inner surface of the mass layer than the second set of ribs, whereby the outer edges of the second set of ribs are normally spaced away from the barrier wall when the outer edges of the first set ribs contact the barrier wall.

17. An acoustical barrier according to claim 16 wherein the first and second sets of ribs are resilient, whereby the first set of ribs resiliently resists compressive force applied to the outer surface of the mass layer at a first predetermined level and the second set of ribs together with the first set of ribs resiliently resist the compressive force at a second predetermined level greater than the first predetermined level.

18. An acoustical barrier according to claim 16 and further comprising an absorber layer having an outer surface in contact with an inner surface of the mass layer and an inner surface adapted to contact the barrier wall.

19. An acoustical barrier according to claim 18 wherein the absorber layer has an opening that is sized to receive the peripheral rib and the absorber layer is located outside of the enclosed area.

20. An acoustical barrier according to claim 16 wherein the mass layer is adapted for installation in a vehicle having the barrier wall, the barrier wall comprises a floor area and a fire wall area extending between a wheel well area and a drive train area, the fire wall area intersects with and extends generally upwardly from the floor area, the mass layer further comprising:
   a wheel well section shaped to conform to at least a portion of the shape of the wheel well area; and
   floor and firewall sections shaped to conform to at least a portion of the shape of the floor and firewall areas, respectively.

21. An acoustic barrier according to claim 20 wherein the enclosed area including the first and second sets of projections are positioned in a podalic zone extending along at least a portion of the floor and firewall sections of the mass layer.

22. An acoustical barrier according to claim 20 wherein the enclosed area including the first and second sets of ribs are positioned in a dead pedal zone extending along at least a portion of wheel well section of the mass layer.

* * * * *